United States Patent [19]
Chandler

[11] 3,753,521
[45] Aug. 21, 1973

[54] INTERMITTENT HIGH SPEED PERFORATOR

[75] Inventor: Jasper S. Chandler, Rochester, N.Y.

[73] Assignee: Eastman Kodak Company, Rochester, N.Y.

[22] Filed: Sept. 7, 1971

[21] Appl. No.: 178,365

Related U.S. Application Data

[62] Division of Ser. No. 40,951, May 27, 1970, Pat. No. 3,656,384.

[52] U.S. Cl................. 226/64, 226/67, 226/71, 226/91, 226/162
[51] Int. Cl. ............................................. G03b 1/22
[58] Field of Search .................. 226/67, 62, 64, 65, 226/66, 71, 162, 163, 164, 165

[56] References Cited
UNITED STATES PATENTS

| | | | |
|---|---|---|---|
| 3,575,330 | 4/1971 | Sniderman | 226/164 |
| 1,293,979 | 2/1919 | Templeton | 226/164 X |
| 1,263,535 | 4/1918 | DeSmith | 226/164 |
| 2,186,010 | 1/1940 | Curtis | 226/67 |
| 1,621,334 | 3/1927 | Reichmann | 226/67 X |

*Primary Examiner*—Allen N. Knowles

[57] ABSTRACT

An intermittent film perforator capable of operating at a shuttling and punching rate up to 12,000 perforations per minute, having a design life of 16,000 hours, and readily adapted to perforate different film formats and film widths. The heart of the perforator is a novel film shuttling mechanism having a cam and follower design which is subject to a minimum of wear and which is resiliently mounted so that it can be tuned to reduce the load of the bearings of the drive therefor.

The perforator is provided with an automatic threading mechanism which will thread unperforated film to and through the punch mechanism and to the shuttle mechanism, thus eliminating the necessity of temporarily splicing the ends of a new film to the end of an expiring film or providing the end of a new film with perforations to insure its being handled by the perforator. This automatic threading mechanism intermittently advances the film to the punch and shuttle mechanism by intermittently frictionally engaging the same and advancing it in increments substantially equal to the perforation pitch and the advancing stroke of the shuttle mechanism.

Both the novel shuttle mechanism and the automatic threading mechanism of the perforator are not limited to use in perforators but can be used independently to intermittently feed motion picture film through a motion picture camera or a motion picture projector with little or no modification.

21 Claims, 18 Drawing Figures

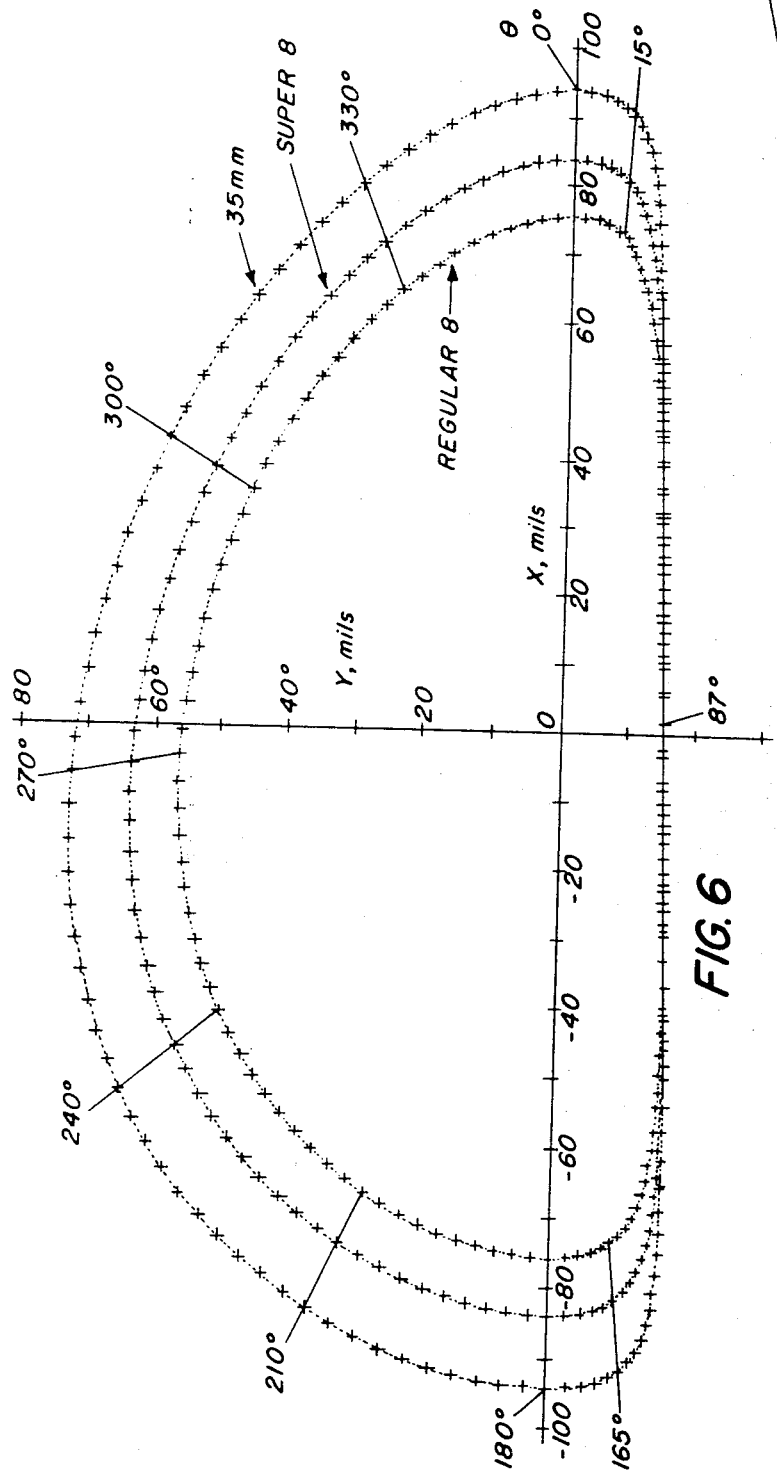
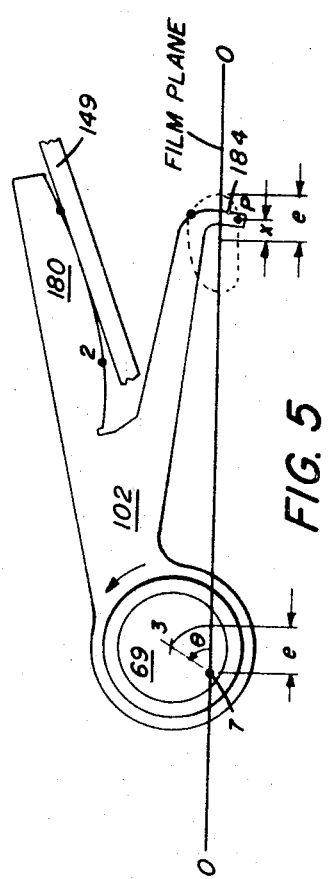
FIG. 5
FIG. 6

INTERMITTENT HIGH SPEED PERFORATOR

This is a division of application Ser. No. 40,951, filed May 27, 1970, now U.S. Pat. No. 3,656,384.

The present invention relates to a perforator for punching a series of holes along the length of a web as it is intermittently advanced, and particularly to such a perforator which perforates film strips at a rate much greater than heretofore possible and which is adaptable to different film formats and film widths.

Continuous and intermittent perforators have been used in the art to perforate a row of perforations in succession along the length of a web or film. In the manufacture of motion picture film, where a high degree of accuracy is required in the formation of the perforations, per se, and the pitch therebetween it has been the usual practice to use perforators having a single frame intermittent shuttle advance in combination with a pilot pin. In such perforators, the film is intermittently advanced through a perforating station by a shuttle mechanism having a claw which engages a perforation in the film previously made by a reciprocal punch which acts on the film in the perforating station while the film is stationary. To insure high accuracy in the pitch betweem perforations, a pilot pin is associated with the punch to move therewith. This pilot pin is located betwen the punch and shuttle mechanisms by a distance from the punch equal to one perforation pitch, and is arranged to enter the perforation previously made by the punch just before the punch engages the film so as to accurately adjust the film advance before a succeeding perforation is made. The pilot pin which is formed to accurately fit a previously made perforation is provided to correct for any slight inaccuracy in film advance which might be made by the shuttle mechanism.

While perforators of the type having a single frame intermittent shuttle advance with pilots are known to possess high accuracy, they are limited as to the speed at which they can be operated because the conventional cam and follower designs they have used in the shuttle mechanism will not stand up for a reasonable length of time under the high accelerations involved in high speed operation. Furthermore, conventional cam and follower designs used in shuttle mechanisms are subject to severe wear, lubrication and heat generation problems, while ball bearing followers are generally too massive and short in life. Another shortcoming of known perforators of this type has been the necessity of temporarily splicing the end of a new web onto the end of an expiring web, or providing the end of the new web with two or more perforations, in order to thread a new web onto the perforator. Also, intermittent film perforators of the type mentioned have had a top speed of about 3,580 perforations per minute and have been designed to handle one format of film, e.g. 35mm, 16mm, 8mm, and/or super 8.

One object of the present invention is to provide an intermittent film perforator capable of operating at a shuttling and punching rate up to 12,000 perforations per minute and having a design life of 16,000 hours.

Another object is to provide a film perforator which can be readily adapted to perforate different film formats and film widths.

A further object is to provide a novel film shuttling mechanism for intermittently engaging a film perforation previously made in the film at the punching station to advance the film for a succeeding punch operation and which is capable of operating at high speeds and for the duration mentioned above.

And still another object is to provide a film shuttling mechanism of the type mentioned which has a cam and follower design which is resiliently mounted and can be tuned to reduce the load on the bearings of the drive therefor.

And a further object is to provide a perforator of the type described having a punch and pilot pin assembly which is arranged to be driven from the same drive shaft as the shuttle mechanism or from a shaft coaxial therewith.

Another object is to provide a perforator of the type disclosed having a curved film gate immediately in front of and behind the punching station to control film curl.

Still another object is to provide a perforator of the type disclosed with an automatic threading mechanism which will thread unperforated film to and through the punch mechanism and to the shuttle mechanism, thus eliminating the necessity of temporarily splicing the end of a new film to the end of an expiring film or providing the end of a new web with two or more perforations to insure its being handled by the perforator.

And yet another object is to provide an automatic threading mechanism of the type mentioned above which intermittently advances the film to the punch and shuttle mechanisms by intermittently frictionally engaging the same and advancing it in increments substantially equal to the perforation pitch and the advancing stroke of the shuttle mechanism.

A further object is to combine the automatic threading mechanism with the perforator so that it can be selectively engaged and will automatically disengage when the end of a new film reaches a point in the film path following the shuttle mechanism.

And another object is to provide two intermittent web feeding mechanisms, one a claw mechanism using perforations in the web and the other a friction feed useful with unperforated webs, which can be used individually to intermittently feed a web through apparatus other than perforators, e.g., motion picture cameras, motion picture projectors, etc.

The novel features which I consider characteristic of my invention are set forth with particularity in the appended claims. The invention itself, however, both as to its organization and its methods of operation, together with additional objects and advantages thereof will best be understood from the following description of specific embodiments when read in connection with the accompanying drawings in which:

FIG. 5 shows a schematic of the high speed shuttle showing the relationship betweeen the upper cam, the flat cam, the shuttle tooth path, the film plane, and the eccentric drive shaft;

FIG. 6 shows plots of shuttle claw paths necessary for the perforation of 35 mm, Super 8, and regular 8 film formats;

Figure 1:
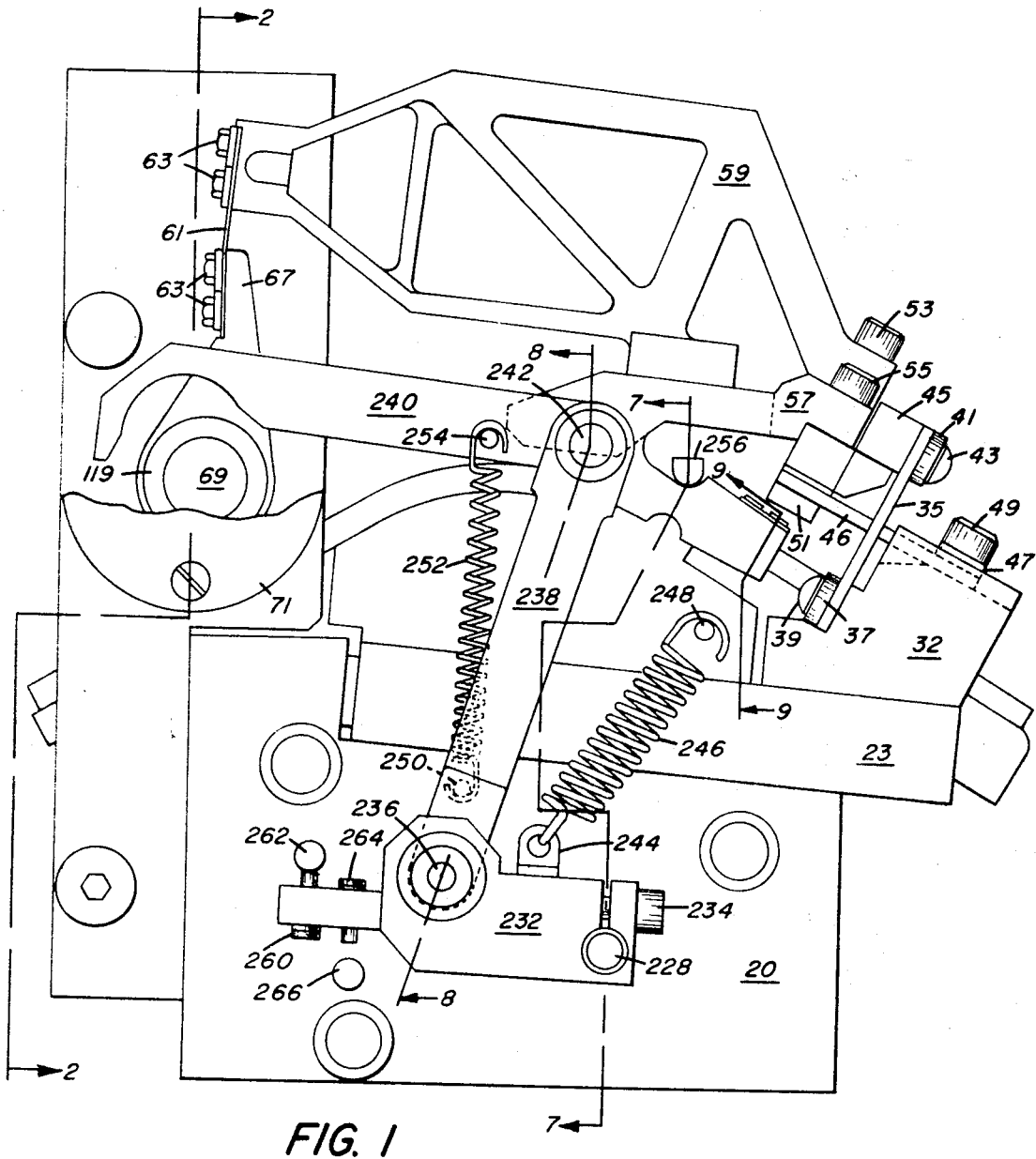
FIG. 1 is a front elevational view of the punch and thread-up shuttle mechanism of a perforating device constructed in accordance with a preferred embodiment of the present invention, with the front frame of the device being partly broken away for purposes of clarity.

Generally, the present film perforator comrpises a perforating station at which a reciprocating punch acts on the film while it is stationary. The film strip is intermittently advanced to and through the perforating station by a shuttle mechanism including one or more claws which engage the perforation(s) made at the perforating station and advance the film one frame at a time. Associated with the punch, and located between it and the point where the shuttle engages the film, is a pilot pin which engages a previously made perforation while the film is stationary and just before the punch engages the film to perforate it. This pilot pin is shaped to accurately fit the perforation and is spaced from the punch a distance which is equal to the pitch spacing desired between the perforations. The purpose of the pilot is to accurately position the film just before the punch makes a successive perforation so as to be assured the pitch between successive perforations is exactly the same. It does this by correcting any inaccuracy there might possibly be in the pull-down stroke of the shuttle mechanism or for any movement of the film which might occur as or after the shuttle claw leaves film perforations. The parts of the perforator are so designed and mounted that it is adaptable to different film formats and widths.

So that a new film can be threaded into the perforator without having the leading end temporarily spliced to the trailing end of an expiring film, or without having to provide the leading end of a new film with perforations, the perforator is provided with an automatic threading mechanism. This comprises an intermittent film feeding mechanism which operates in synchronism with the punch and shuttle feed and frictionally engages the film to feed it intermittently one frame at a time to and through the punch mechanism to the shuttle mechanism. This automatic threading mechanism is selectively operated at a speed below the top speed of the perforator and cannot be activated unless the perforator has been disconnected from the high speed power source for a time greater than a preselected time delay to insure that the machine has stopped. The automatic threading mechanism is combined with the perforator so that after the shuttle mechanism has assumed control of the film leaving the punching station the automatic threading mechanism will be automatically disengaged and the perforator can be brought up to top speed.

It is pointed out that the key element is this perforator design is the shuttling mechanism which moves the film intermittently at a rate as high as 12,000 perforations per minute without damage, and which operates with accuracy and low maintenance over a long span of life. Since the accleration of a reciprocating mechanism increases as the square of the speed and linearly with the distance traveled, it has been found that the shuttle mechanism for feeding a 35mm film is subjected to accelerations which are over seven times those for a shuttle for a 16mm film running at 3,580 rpm. Because of the high accelerations involved, it was found impossible to use conventional cam and follower designs for shuttle mechanisms operating at speeds as high as 12,000 perforations per minute because sliding follower members are subject to severe wear, lubrication, and heat generation problems. The shuttle mechanism designed for this perforator utilizes very light aluminum parts which are symetrically loaded. A rocker cam and flat cam arrangement which is used to control the claw tip to the desired path of travel incurs very little slippage (relative sliding movement of the cooperating surface of the cams) and, therefore, has a long life even though fabricated of lightweight materials. The flat cam is mounted in an aluminum carriage which extends lengthwise of the film path. The carriage is supported by two groups of vertical suspension springs which are tuned to the operating speed of the carriage. The shuttle arm is driven through ball bearings by an eccentric at one end. The rocker cam is attached to the shuttle arm and contacts the flat cam. A coupling spring transmits horizontal motion from the shuttle arm to the carriage member in such a manner as to produce negligible slippage between the cams, and also maintains proper contact pressure between the cams. It has been found that the design of this shuttle mechanism for SUPER 8 film (pitch 0.1667inch) is also satisfactory for 35 mm film (pitch 0.187 inch), and for 8mm film (pitch 0.150 inch). The only change required is the eccentricity of the drive and the shape and size of the claw tooth member(s) of the shuttle.

Referring now to the drawings, and initially to FIGS. 1, 2, 3, and 7 thereof, it will be seen that a perforating device embodying the present invention has a base plate 23 attached to base block 20 by any suitable means (not shown). The side plate 25 (shown in FIG. 7) and back side plate 27 (see FIG. 7) are attached to base plate 23 by any suitable means (not shown). Spring holder 32 is attached to base plate 23 by any suitable means, (not shown). Two flat parallel springs 35 are attached at one end to spring holder 32 by clamping strips 37 and bolts 39. Springs 35 are attached at the other end to punch support 45 by clamping strips 41 and bolts 43. The purpose of clamping strips 37 and 41 is to rigidly hold the ends of springs 35 so that the desired bending behavior of springs 35 is obtained. Flat spring 46 is attached to spring holder 32 by clamping strip 47 and bolts 49. Punch truss 59 is attached at one end to punch support 45 by bolts 53 which pass through flat spring 46 and thread into clamping strip 51. Punch holder 57 is attached to punch support 45 by bolts 53 which pass through flat spring 46 and thread into clamping strip 51. The purpose of clamping strips 47 and 51 is to rigidly hold the ends of flat spring 46 so that the desired bending behavior of flat spring 46 is obtained.

Punch support 45 is free to pivot about the intersection of the plane of flat parallel springs 35 and of the plane of the flat spring 46. The pivot axis thus formed by the intersection of the flat parallel springs 35 and flat spring 46 may be considered as fixed in space the same as a rigidly mounted hinge.

Figure 2:
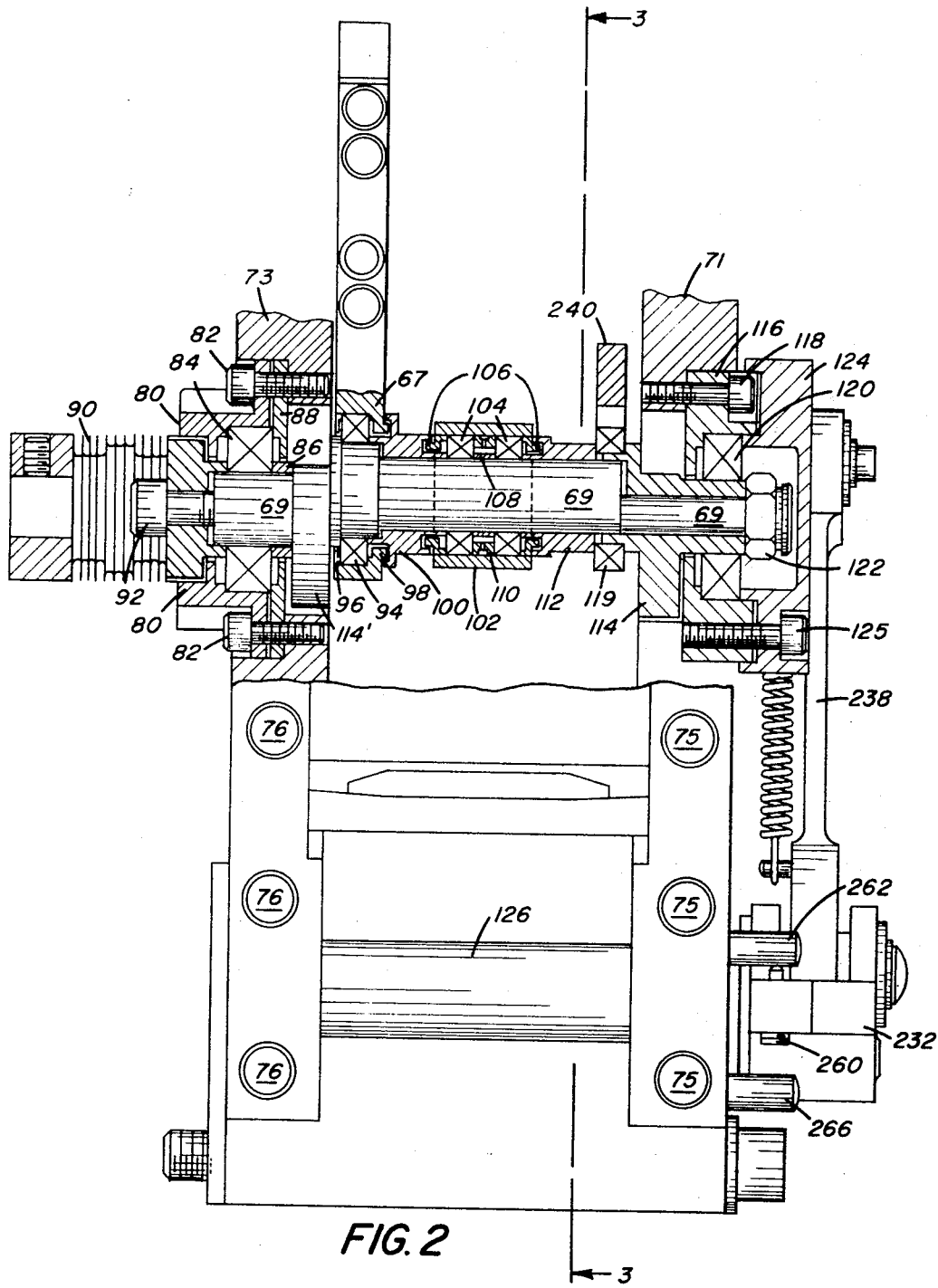
FIG. 2 is a transverse sectional view taken substantially along line 2—2 of FIG. 1, and showing the main shaft assembly.

This type of spring hinge differs from a conventional hinge in three important respects. First, there is no play in the spring hinge and no play can develop as a result of wear or loss of oil film; second, no lubrication is required, and, therefore, maintenance is reduced and the danger of oil getting on the film and in helping to attract dirt accumulations is minimized; and, third, the springs do not create a friction torque and do produce a restoring torque proportional to the angle of displacement from the neutral position or zero stress position. In actual practice, this restoring torque has no detrimental effects but is actually used to tune assemblies to supply sinusoidal acceleration torque at the operating speed of the perforator. The length and thickness of flat parallel springs 35 and flat spring 46 must be chosen to keep the operating stress well below the endurance limit of the spring material.

one end of connecting spring 61 is attached to the other end of punch truss 59 by bolts 63. The other end of connecting spring 61 is attached to punch driver arm 67 by bolts 63. Punch driver arm 67 is rotatably attached to eccentric drive shaft 69 which is suitably eccentrically journaled to rotate and is supported by front bearing plate 71 (as shown in FIG. 2) and rear bearing plate 73 (see FIG. 2) by a bearing assembly which will be desribed in more detail with reference to FIG. 2. Bolts 75 (as shown in FIG. 2) attach front bearing plate 71 to base block 20, and bolts 76 (see FIG. 2) attach rear bearing plate 73 to base block 20.

Let us now consider FIG. 2, which shows the main drive shaft assembly in detail. This assembly is discussed in considerable detail in order to show how the film perforator can be readily adapted to perforate different film formats and film widths. The configuration in FIG. 2 is that necessary to perforate 35mm film. Main ball bearing 84 is fitted on eccentric drive shaft 69 and constrained axially at the outer race by end cap 80 and dirt seal plate 88 which clamps against bearing plate 74 by action of bolts 82. Flexible coupling 90 is attached to eccentric drive shaft 69 by screw 92. The purpose of flexible coupling 90 is to allow for slight misalignment between eccentric drive shaft 69 and the motor drive shaft (not shown). The screw 92 clamps the right end portion of the coupling against the inner race of main bearing 84 and spacer 86 thus constraining the eccentric shaft in the axial direction. Split ball bearing 94 is fitted on an eccentric drive shaft 69 and pressed into punch driver arm 67. Oil shields 96 and 98 are pressed into punch driver arm 67. Back shuttle spacer 100 is then slid onto eccentric drive shaft 69 and constrained axially in one direction by split ball bearing 94 and axially in the other direction by split ball bearing 104. Shuttle arm 102 is journaled to rotate relative to eccentric portion 99 of the drive shaft 69 between spacers 100 and 112 through a bearing assembly that is comprised of two split ball bearings 104, two oil shields 106, and spacers 108 and 110. Front shuttle spacer 112 is fitted on eccentric drive shaft 60 and constrained axially in one direction by split ball bearing 104 and axially in the other direction by split ball bearing 119. Split ball bearing 119 is fitted onto counterweight sleeve 114 which is slid onto eccentric drive shaft 69. Main ball bearing 120 fits into end spacer 116 and is also fitted over counterweight sleeve 114. End spacer 116 is then rigidly attached to front bearing plate 71 by screws 118. Nut 122 threads onto eccentric drive shaft 69, and is used to tighten the entire shaft assembly together. End cap 124 is rigidly attached to end spacer 116 by screws 125 and the outer race of bearing 120 is clamped in the process.

The eccentricity of eccentric drive shaft 69 at the shuttle bearings 104 for the 35mm film application is a little more than one-half of the pitch of 35mm film which pitch is 0.0935 in. The small excess of the order of 0.0.0007 in. allows for bearing clearance and deflection and insures easy entrance of the claw without scuffing against the perforation edge. If film having a different pitch is desired to be perforated, the only changes that need to be made in the main drive shaft assembly as shown in FIG. 2 is that eccentric drive shaft 69 must be replaced by one having the desired eccentricity at the bearings 94 and 104, counterweight sleeve 114 must be replaced by one having the proper geometry, and the counterweight portion 114' of eccentric shaft 69 is also suitably altered. Back shuttle spacer 100 must also be suitably altered. If it is desired to perforate Super 8 film, the eccentricity of eccentric drive shaft 69 at bearings 94 and 104 must be 0.0834 in. plus overage allowance, and for regular 8mm film the eccentricity must be 0.075 in. plus allowance. Of course, the size and shape of the claw tooth members of the shuttle and the punch and die arrangement must also be appropriately changed in order to perforate film of different widths and different formats.

Figure 3:
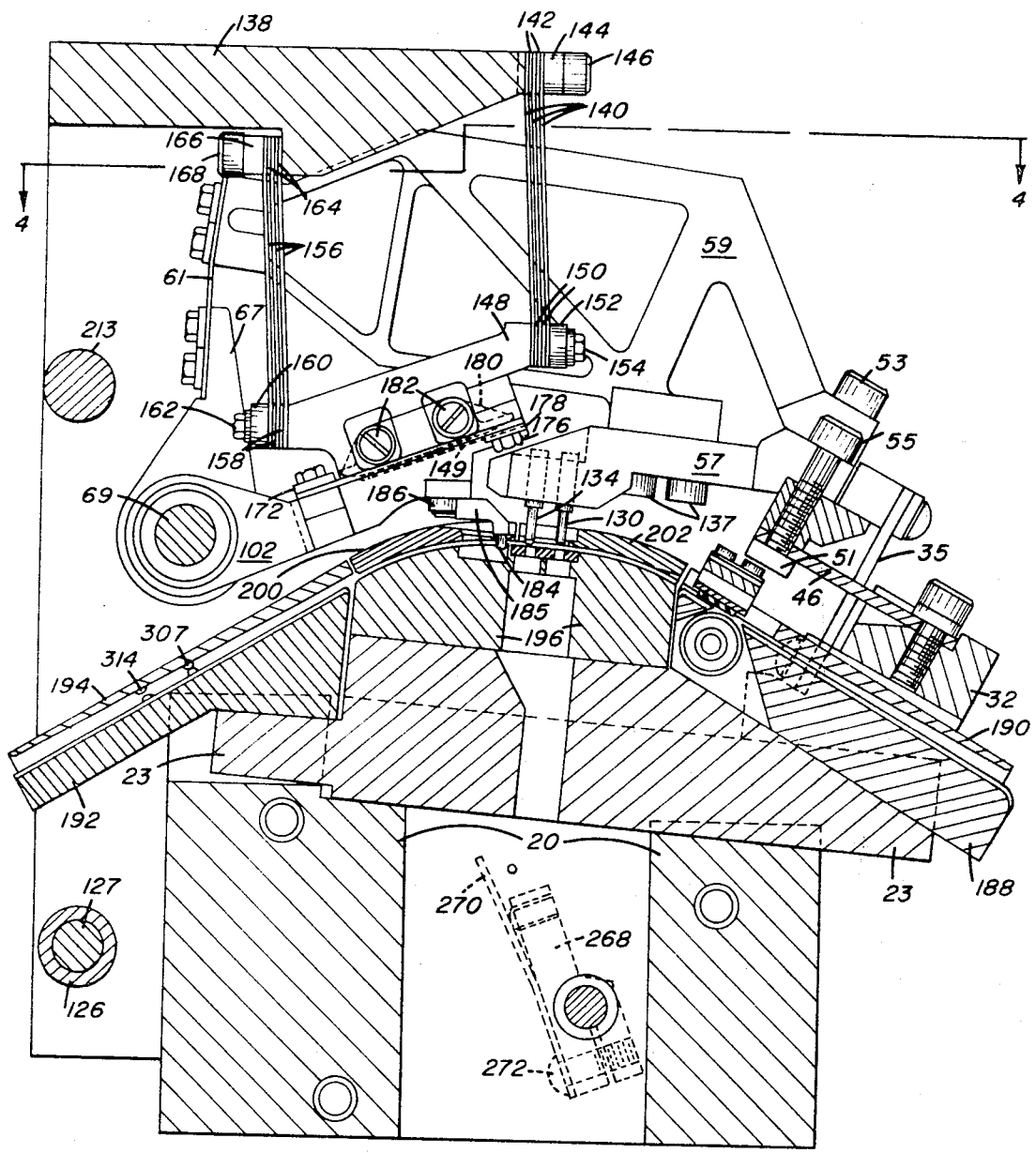
FIG. 3 is a sectional view of the punch and thread-up shuttle mechanism of the perforating device taken substantially along line 3—3 of FIG. 2.

Spacer sleeve 126 is slid over lower shaft 127 )as shown in FIG. 3) which is rigidly attached to front bearing plate 71 and rear bearing plate 73 by bolts (not shown). The purpose of this arrangement is to insure that proper spacing is maintained between bearing plates 71 and 73.

Figure 4:
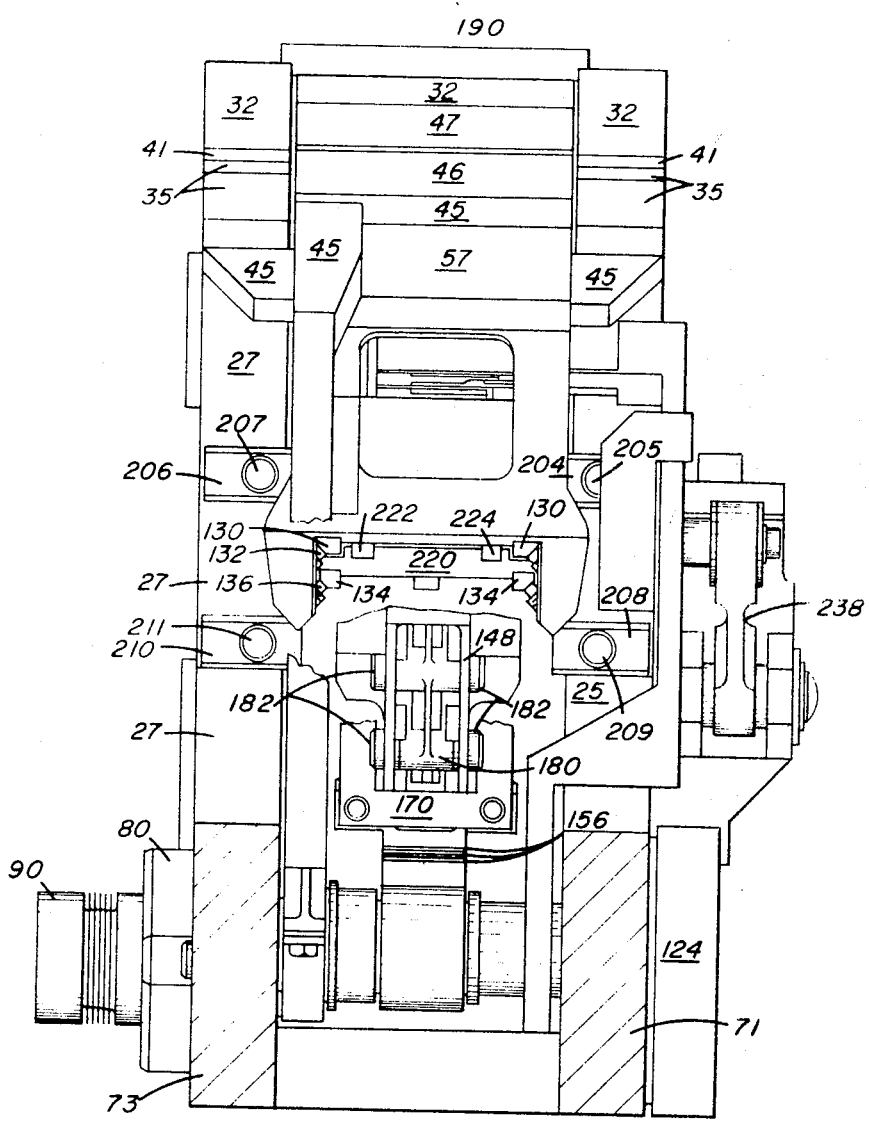
FIG. 4 is a top view taken substantially along the line 4—4 of FIG. 3.

As shown in FIG. 3, two punches one for each margin of the film 130 are held in punch holder 57 by set screws 132, which are shown in more detail in FIG. 4. Two pilot pins 134 one for the perforations at each margin of the film, are held in punch holder 57 by set screws 136 (see FIG. 4). Punch holder 57 is attached to punch truss 59 by bolts 137 and 53. Top plate 138 is attached to front bearing plate 71 and rear bearing plate 73 by any suitable means (not shown). Three parallel leaf springs 140 appropriately spaced by washers 142 and constrained by clamping spacer 144 are attached to top plate 138 by bolts 146. The other end of parallel springs 140 are appropriately spaced by washers 150 and constrained by clamping spacer 152 and attached to flat cam carriage 148 by bolts 154. The purpose of clamping spacer 144 is to rigidly attach flat parallel springs 140 to top plate 138 and to insure the desired bending behavior of parallel springs 140. The purpose of clamping spacer 152 is to rigidly attach parallel springs 140 to flat cam carriage 148 and to insure proper bending behavior of parallel springs 140.

The other end of flat cam carriage 148 is attached by bolts 162 to one end of three parallel springs 156 whose ends are appropriately spaced by washers 164 and constrained by clamping spacer 166 and attached to top plate 138 by bolts 168. The purpose of clamping spacer 160 is to rigidly attach parallel springs 156 to flat cam carriage 148 and to insure the proper bending behavior of flat parallel springs 156. The purpose of clamping spacer 166 is to rigidly attach parallel springs 156 to top plate 138 and to insure the proper bending behavior of parallel springs 156. Flar cam 149 is rigidly cemented into flat cam carriage 148.

Rocker cam 180 is attached to shuttle arm 102 by screws 182. Shuttle bracket 185 is attached to shuttle arm 102 by bolts 186. The film is intermittently advanced through the perforating station two shuttle claws or teeth 184 on shuttle bracket 185 of the shuttle mechanism, each of which engages a perforation in the film previously made by a respective reciprocal punch 130 which acts on the film in the perforating station while the film is stationary.

To insure high accuracy in the pitch of the perforations, pilot pins 134 are associated with the punches 130 and move therewith. Pilot pins 134 are located between punches 130 and shuttle teeth 184 by a distance equal to one perforation pitch from the punch and are arranged to enter the perforations previously made by the punches just before the punches engage the film so as to accurately adjust the film advance before succeeding perforations are made. Pilot pins 134 are formed to accurately fit previously made perforations and their purpose is to correct for any slight inaccuracy in film advance which might be made by the shuttle mechanism.

The shuttle mechanism designated for this perforator utilizes very lightweight aluminum parts which are symmetrically loaded. The arrangement of rocker cam 180, flat cam 149, and flat cam carriage 148 which are used to control the motion of shuttle teeth 184 to the desired path of travel, incurs very little slippage between the cams 180 and 149, and, therefore, has a long life even though fabricated of lightweight material. Flat cam carriage 148 extends lengthwise of the film path and is supported by two groups of suspension springs, 140 and 156, which are tuned to the operating speed of flat cam carriage 148. Shuttle arm 102 is driven through ball bearings 104 by eccentric shaft 69. Rocker cam 180 is integral with or attached to shuttle arm 102 and contacts flat cam 149. Rocker cam 180 has an arcuate surface which rides on flat cam 149, and gives the required motion of shuttle teeth 184. U-shaped coupling spring 170 (see FIG. 4) transmits motion from shuttle arm 102 to flat cam carriage 148 in such a manner as to produce negligible slippage between the cams 180 and 149, and also maintain proper contact pressure between the cams at all speeds of operation of the shuttle mechanism.

As mentioned above, springs 140 and 156 are tuned to the operating speed for the mass of flat cam carriage 148 and all parts associated with its connection to the free ends of the flat parallel springs 140 and 156. Flat cam carriage 148 slants at substantially 20° to the film path to make the acceleration pattern of the drive system for the flat cam carriage 148 approach a simple harmonic that can be, and is tuned by the flat parallel springs 140 and 156.

The end of U-shaped coupling spring 170 that is attached to shuttle arm 102 by bolts 172 is tilted slightly in a counter-clockwise direction relative to the remainder of the spring for maintaining contact pressure between the cams at all speeds of operation.

The left end of punch truss 59 is operatively connected to eccentric drive shaft 69 through punch driver arm 67 and connecting spring 61. The other end of punch truss 59 is pivotally mounted by crossed springs 46 and 35, which causes punches 130 to reciprocate across the film path to perforate the film.

Pilot pins 134 are slightly longer than punches 130 to enter previously formed perforations just as shuttle teeth 184 are leaving perforations and before punches 130 engage the film to insure the film being advanced the desired pitch before a pair of successive perforations is made therein.

The film is fed into the perforator through a guideway comprising a film apron 188 which is attached to base plate 23 by suitable means (not shown) and a film apron cover 190 attached to film apron 188 by suitable means (not shown). The film leaving the perforating station passes through a guideway comprising a film apron 192 attached to base plate 23 by suitable means (not shown), and a film apron cover 194 attached to takeup side film apron 192 by suitable means (not shown).

Figure 7:
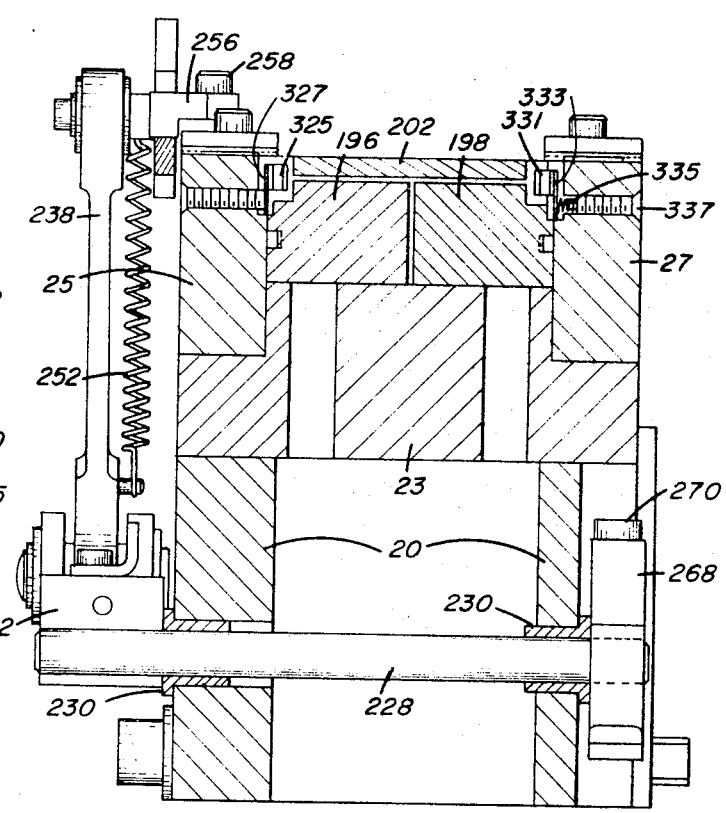
FIG. 7 is a transverse sectional view taken substantially along the line 7—7 of FIG. 1, and showing the thread-up shuttle assembly.

Front die holder 196 (as shown in FIG. 7) and rear die holder 198 (see FIG. 7) are attached to base plate 23 by suitable means (not shown). Punch side stripper 202 is supported from the bottom by die holders 196 and 198 (see FIG. 7) and constrained in the upwards direction by stripper clamp 204 (as shown in FIG. 4) which is attached to front side plate 25 by screw 205, and by stripper clamp 206 (see FIG. 4) which is attached to back side plate 27 by screw 207.

Take-up side stripper 200 is supported from the bottom by die holders 196 and 198 (see FIG. 7) and constrained in the upwards direction by stripper clamp 208 (as shown in FIG. 4) which is attached to front side plate 25 by bolt 209 (see FIG. 4) and stripper clamp 210 (see FIG. 4) which is attached to back side plate 27 by bolt 211 (see FIG. 4). Spacer sleeve 213 (see FIG. 3) is attached to front bearing plate 71 (not shown) and rear bearing plate 73 (not shown) by suitable means (not shown). The purpose of spacer sleeve 213 is to insure the proper spacing between bearing plates 71 and 73.

As shown in FIG. 4, pilot pin spacer 220 is loosely held between pilot pins 134 and punches 130. Pilot pin wedges 222 and 224 are forced into grooves in pilot pin spacer 220 to obtain fine adjustment of the lateral position of pilot pin spacer 220.

FIG. 5 shows a schematic of the high speed shuttle showing the relationship between rocker cam 180, flat cam 149, path of point P on shuttle teeth 184, the film plane, and eccentric drive shaft 69. The eccentricity of drive shaft 69 will be designated by $e$. As eccentric drive shaft 69 rotates in the direction shown, rocker cam 180 rides on flat cam 149, and shuttle arm 102 and shuttle teeth 184 move in such a way as to cause point P on shuttle teeth 184 to move in the path shown schematically by the dotted line in FIG. 5. It should be noted that the total stroke length during one stroke is equal to twice the eccentricity of eccentric drive shaft 69 or $2e$.

Since flat cam 149 is coupled to shuttle arm 102 by U-shaped coupling spring 170 (as shown in FIG. 4) and is suspended by flat parallel springs 140 and 156, flat cam 149 necessarily oscilates back and forth parallel to itself and moves up and down parallel to itself. This motion in combination with the rocking motion of the arcuate surface of rocker cam 180 gives negligible slippage between cams and the desired motion of shuttle teeth 184.

As shown in FIG. 5, at the starting point (angle $\theta = 0$), the point 2 on rocker cam 180 is in contact with flat cam 149, and the reference point P on the shuttle teeth 184 is on the axis (horizontal line 0—0) with the value of $x=e$. The drive point 3 rotates about the fixed point 7 at an eccentricity of $e$. To some extent the choices of dimensions and shape of rocker cam 180 are arbitrary, but they are largely dictated by consideration of the desired film pitch, the amount of in-and-out travel required to clear the stripper, the straightness of the path after full engagement, and the squareness of the corners without incurring excessive upward accelerations. While the cam 149 is described above as having a planar surface for cooperation with the convex surface of the rocker cam 180, it is to be understood that the surface of cam 149 need not be planar, it may be concave or convex. The requirement of the surfaces of the cams 180 and 149 is that they should be so formed that as the shaft 69 rotates, the value of Y should vary by a minimal amount while the claw 184 is disposed in a perforation, that is, during a pull-down stroke and that the claw should enter and leave a perforation in directions substantially perpendicular to the film plane.

FIG. 6 shows plots of the path of Point P of the shuttle teeth 184 for 35mm, Super 8, and regular 8 film. The degree values indicated in FIG. 6 correspond to eccentric drive shaft 69 angle $\theta$ as shown in FIG. 5. For 35mm film, the eccentricity $e$ of the eccentric drive shaft 69 is 94.2 mils. For Super 8 film, the eccentricity of eccentric drive shaft 69 is 84.0 mils. For regular 8mm film, the eccentricity of eccentric drive shaft 69 is 75.6 mils. These values are slightly more than one half film pitch to allow for bearing clearance and to provide free entry of teeth 184.

In order to eliminate the necessity of temporarily splicing the end of a new film to the end of an expiring film, or providing the end of a new web with one or more perforations to insure its being handled by the perforator, this perforator incorporates an automatic threading mechanism which will thread unperforated film to and through the punch mechanism and to the shuttle mechanism. This automatic threading mechanism intermittently advances the film to the punch and shuttle mechanisms by intermittently frictionally engaging the film and advancing it in increments substantially equal to the perforation pitch and the advancing stroke of the shuttle mechanism.

In order to investigate this automatic threading mechanism in more detail, let us return our consideration to FIGS. 1, 3 and 7. Shaft 228 is rotatably journaled in bearings 230 (as shown in FIG. 7) which are supported by base block 20. Arm 232 is rigidly attached to shaft 228 by bolt 234 (as shown in FIG. 1). Arm 238 is attached to arm 232 by bearing stud 236 and a bearing assembly, which will be described in more detail with reference to FIG. 8. Engagement arm or shuttle arm 240 is attached to arm 238 by shaft 242 and a bearing assembly which will be discussed in more detail below. One end of engagement arm 240 rides on eccentric split ball bearing 119 (as shown in FIG. 2) in an engaged position. One end of spring 246 is hooked onto spring anchor pin 244 which is attached to arm 232. The other end of spring 246 hooks around pin 248 which is rigidly attached to front side plate 25. The purpose of spring 246 is to urge arm 232 and shaft 228 in a clockwise direction. One end of spring 252 hooks around pin 250 which is rigidly attached to arm 238. The other end of spring 252 is hooked around pin 254 which is rigidly attached to engagement shuttle arm 240. The purpose of spring 252 is to urge the left end of engagement arm 240 in a counter-clockwise direction in relation to arm 238.

Stop 256 is attached to front side plate 25 by bolts 258 (as shown in FIG. 7). The purpose of stop 256 is to limit the counter-clockwise travel of the right-hand end of engagement arm 240 when the thread-up shuttle is in the disengaged position as shown in FIG. 1. Stop pins 262 and 266 are rigidly attached to base block 20 to limit the travel of arm 232. To the other end of shaft 228 is attached bracket 268 (as shown in FIG. 3). Flat spring 270 (see FIG. 3) is attached to bracket 268 by screw 272 (see FIG. 3).

Figure 12:
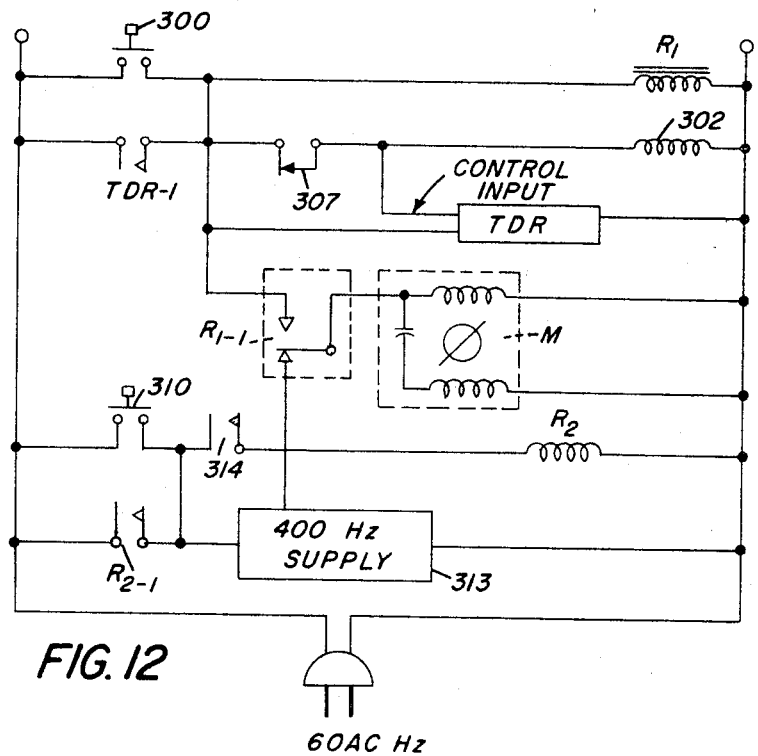
FIG. 12 shows the electrical control diagram for both thread-up and high speed operations.

In order to see how the thread-up shuttle mechanism is placed in the operative position, let us turn our attention to FIGS. 1 and 3, in which the thread-up shuttle is presently shown in the disengaged or inoperative position. In order to place it in the operative position, an electrically energized solenoid 302 (see FIG. 12) is energized which urges the top of flat spring 270 (as shown in FIG. 3) in the counter-clockwise direction. The purpose of flat spring 270 is to allow for over travel of solenoid 302. The counter-clockwise motion of flat spring 270 rotates bracket 268 in the counter-clockwise direction. Since bracket 268 is connected to shaft 228 by screw 272, shaft 228 also rotates in the counter-clockwise direction. Arm 232 will rotate in the counter-clockwise direction until set screw 264 is limited in its travel by stop pin 266. Arm 240 will now be lowered away from stop 256 thus allowing spring 252 to urge the left end of engagement arm 240 into contact with ball bearing 119 (as shown in FIG. 2). As the left end of engagement arm 240 rides on eccentric bearing 119 the right end of engagement arm 240 will move in a path such that it frictionally grips and advances the web to and past the punching position in increments substantially equal to one perforation pitch. The frictional means by which the film is gripped by the right end of engagement arm 240 will be discussed in more detail below with reference to FIG. 9.

In order to disengage the thread-up shuttle assembly, the electrical solenoid 302 when de-energized will cease to press on flat spring 270. Spring 246 will then urge arm 232 in a clockwise direction causing shaft 242 to move in a direction such that the film is disengaged, the arm 240 in so moving striking stop 256 causing the left end of engagement arm 240 to move out of engagement with eccentric ball bearing 119 (as shown in FIG. 2).

Figure 8:
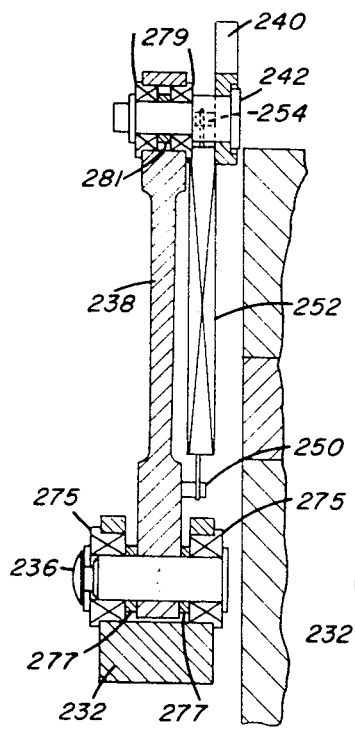
FIG. 8 is a fragmentary sectional view taken substantially along the line 8—8 of FIG. 1, and showing bearing assemblies for the thread-up shuttle.

As shown in FIG. 8, the lower end of arm 238 is rotatably journaled to arm 232 by a bearing assembly comprising bearing stud 236 suitably held by two ball bearings 275 and spacers 277. Shaft 242 is journaled to rotate in the upper end of arm 238 through a bearing assembly comprising two ball bearings 279 and spacer 281. Engagement arm 240 is press fitted onto shaft 242.

Figure 9:
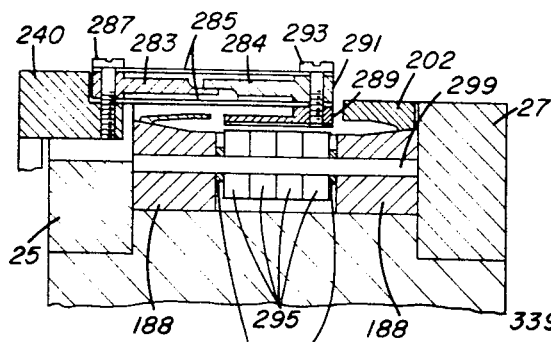
FIG. 9 is a transverse sectional view taken substantially along the line 9—9 of FIG. 1, and showing the thread-up shuttle film engagement area.

FIG. 9 shows that stop arm 283 and one end of flat springs 285 are attached to engagement arm 240 by bolts 287. Shuttle pad 289 and stop arm 291 are attached to the other end of springs 285 by bolts 293. The bottom surface of shuttle pad 289 is covered with a high friction material, such as polyurethane, to further enhance the film driving action. Four ball bearings 295 and two spacers 297 are attached to shaft 299 which is rigidly attached to apron member 188. As shown in FIG. 9 flat springs 285 in connection with stop arms 283 and 291 comprises a resilient breakaway connection causing shuttle pad 289 to move with the shuttle at all times except after the shuttle pad 289 moves into engagement with the face of the film, at which time engagement arm 240 moves relative to shuttle pad 289 and stresses springs 285 which resiliently urge shuttle pad 289 into engagement with the film. As the left end of engagement arm 240 rides on eccentric bearing 119 (as shown in FIG. 2) the right end of engagement arm 240 causes shuttle pad 289 to move through the open top of the film guideway and into pressing engagement with the face of the film at the beginning of and during the film advancing stroke of the shuttle to advance the film. At the end of the film advancing stroke the right end of engagement arm 240 moves so as to retract shuttle pad 289 from engagement with the film and hold it retracted during the return stroke.

Figure 11:
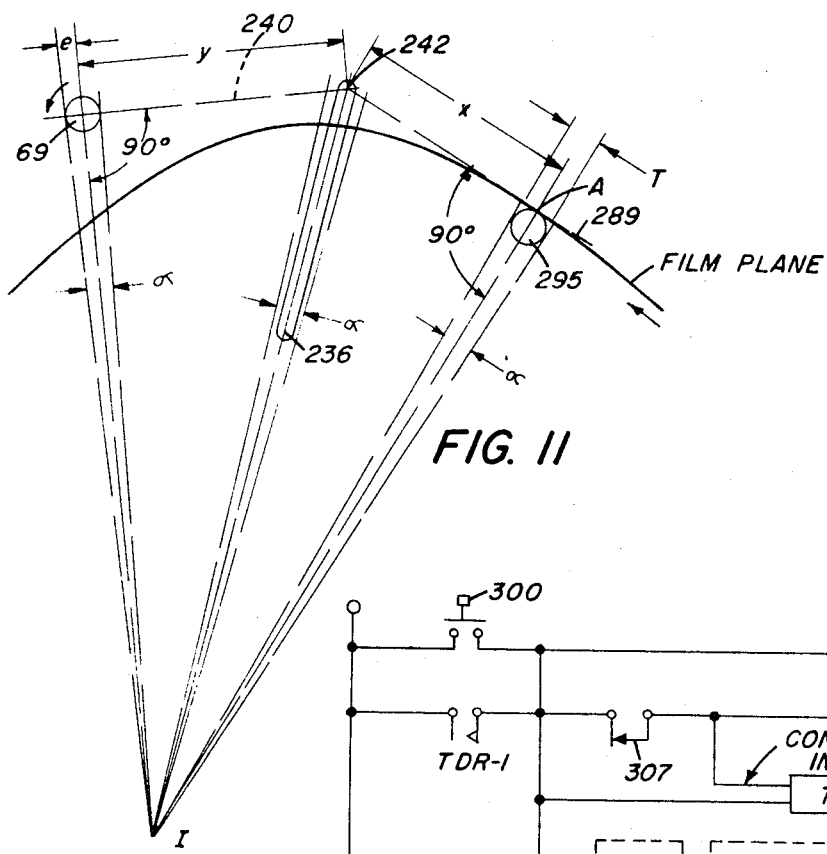
FIG. 11 is a schematic of the thread-up shuttle mechanism showing the geometrical relationships of the eccentric drive shaft, the engagement arm pivot point, and the film engagement area.

In order to determine the correct relationship between the locations of eccentric drive shaft 69, bearing stud 236, shaft 242, and ball bearings 295 let us look at a schematic of the geometry as shown in FIG. 11. FIG. 11 shows schematically the side view of the zone of the film path to be occupied by the thread-up shuttle. The film path with free turning ball bearings 295 just below the film surface and the location of eccentric drive shaft 69 are known. We must establish the location of shaft 242 which swings about the bearing stud 236 and the eccentricity e at the driver required to obtain the desired film advance T.

The right end of engagement arm 240, shown in FIG. 11 by dotted line, is fitted with the shuttle pad 289 (see also FIG. 9) which is spring loaded against a stop and so adjusted that it pinches the film against ball bearings 295 during approximately one-half of the eccentric rotation and lifts away from the film for the remainder of the time when the thread-up shuttle mechanism is in its operative condition. It is also understood that the left end of engagement arm 240 (as shown in FIG. 1) engages the split ball bearing 119 (as shown in FIG. 2) during the time required for thread-up and then is disengaged and does not contact the eccentric bearing 119 or the film during the remainder of perforating the roll of film.

It is necessary that the motion of shuttle pad 289 be essentially perpendicular to the plane of the film at the instant of making contact and at the instant of leaving the film. The produces the most accurate control of the film motion as no longitudinal motion takes place during the short interval of time when pinching pressure is being established or released. We therefore locate shaft 242 in the plane of the film as extended beyond the location of ball bearings 295 (as shown in FIG. 11). The length of the arm from point A on shuttle pad 289 to shaft 242 is of secondary importance but it has been found well to make the distance X from the center of shaft 242 to point A a little shorter than the distance Y between the center of eccentric drive shaft 69 and shaft 242. This produces a motion at the right end of engagement arm 240 which is essentially elliptical in shape, the minor axis being perpendicular to the film.

Now draw the line from the center of rotation of bearings 295 which is perpendicular to the film and also draw the line from the center of rotation of eccentric shaft 69 which is perpendicular to the line drawn from the center of shaft 242 to the center of eccentric drive shaft 69. The intersection of these lines defines the point I. It can be seen that the two extreme positions of the travel of engagement arm 240 can be analyzed as if it had physically been constrained to rotate about point I as an axis. The center of the eccentric bearing 119 (as shown in FIG. 3) on the eccentric shaft 69, the center of shaft 242, and the point A at their extreme positions all move a distance corresponding to the angled measured about axis I. It follows directly that the eccentric travel 2e must be equal to the desired film travel T multiplied by the ratio of the lengths of the line from the center of eccentric shaft 69 to point I divided by the distance from point A to point I. It also follows that the advance angle is $180° + \alpha$, The phase relation between eccentric position and film travel is also readily understood from this construction.

The moving pivot, shaft 242, can be constrained by an arm pivoted at I, however it is usually not practical to operate at this great a distance. The action is entirely satisfactory if another pivot point such as point 236 is chosen so long as the point 236 falls on the line between the center of shaft 242 at its mid stroke and point I.

Strictly speaking the center of shaft 242 does not remain in the plane of the film because the line between the center of shaft 242 and the center of bearing stud 236 is not perpendicular to the film plane at ball bearings 295. However the plane of the shuttle pad 289 slightly modifies the film path and does the clamping or lifting off strictly in a direction perpendicular to itself.

The automatic threading mechanism described above is combined with the perforator so that it can be selectively engaged and will automatically disengage when the end of a new film reaches a point in the film path following the shuttle mechanism and, after the shuttle teeth 184 have control of the film. To understand this operation better, attention is called to FIG. 12, which shows the thread-up shuttle electrical control diagram. There is no film in the perforator when it is desired to begin the thread-up sequence. Thread-up button 300 is pressed and then released. Time delay relay TDR is energized, which closes its normally open switch TDR-1. Solenoid 302 is energized and pushes against spring 270 to rotate shaft 228 counterclockwise thus causing engagement arm 240 to come into engagement with ball bearing 119 and be driven by eccentric drive shaft 69, hence putting the thread-up mechanism in the engaged or operative condition as described in detail above. Relay R1 simultaneously is energized which closes its normally open switch R1-1. As normally opened switch R1-1 is closed, motor M driving eccentric shaft 69 begins running at 1,800 rpm. The end of a roll of unperforated film is then inserted into the channel between the supply side film apron 188 (as shown in FIG. 3) and supply side film apron cover 190 (as shown in FIG. 3). The thread-up shuttle mechanism then advances the film in the manner described in detail above until normally closed switch 307 in the film path defined by the take-up side film apron 192 and take-up film apron cover 194 (as shown in FIG. 3) is reached by the film. When the film reaches normally closed switch 307 it opens it. This causes solenoid 302 to become de-energized thus allowing engagement arm 240 (as shown in FIG. 2) to move out of contact with ball bearing 119 (as shown in FIG. 2) hence putting the thread-up shuttle mechanism in the inoperative condition as described in detail above. Time delay relay TDR then starts a time delay of approximately 10 seconds. After the 10 seconds has elapsed, time delay relay TDR is de-energized which in turn opens its switch TDR-1 which de-energizes relay R1 causing its switch to revert to the position shown, causing motor M to stop. The thread-up operation is now complete.

After the threading operation is complete and the high-speed shuttle mechanism is capable of controlling the film, the machine is put in high speed operation in the following manner. Again referring to FIG. 12, high speed start button 310 is pressed and released. Relay R2 is energized which makes its normally open switch R2-1. The closing of switch R2-1 turns on 400 Hz supply 313 which powers motor 306 at 12000 rpm through normally closed switch R1-1. The film is then perforated in the manner described in detail above. Located in the film path adjacent to switch 307 there is a second switch 314, normally open, which is closed when film is in this position of the film path but which normally opens when there is no film in this portion of the film path. Since film has already been threaded through the perforator past this switch 314 it is closed which allows the motor M to operate at high speed. When the trailing end of the film passes switch 314 it returns to its normally open state to de-energize relay R2 and this in turn allows its switch R2-1 to return to the normally open condition shown and cut off the 400 Hz supply 313 whereupon the motor stops. The perforation is then complete.

Figure 10:
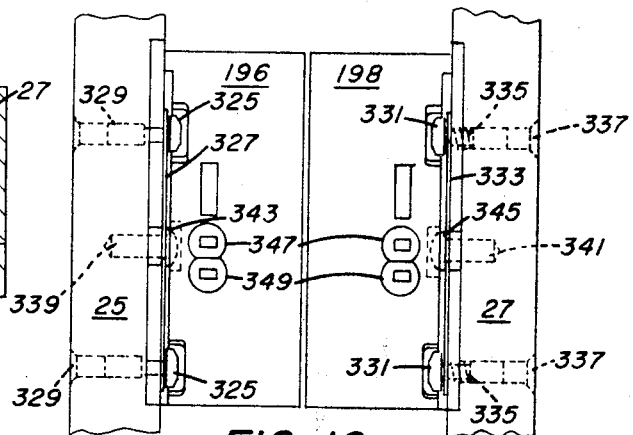
FIG. 10 is a top view of FIG. 7 with the strippers removed and showing edge guiding and die arrangements necessary to perforate regular 35 mm film.

In order to see how the film is guided to and through the perforating station, let us look at FIG. 10. As shown in detail in FIG. 10, edge guide buttons 325 are attached to flat spring 327 which is attached at its center in spaced relation to the front side plate 25 by means of a clamp screw 339 and by spacer 343. Set screws 329 which are threaded into front side plate 25 press against spring 327 thus controlling its position. Edge guide buttons 331 are attached to spring 333 which is attached at its center in spaced relation to the back side plate 27 by means of the clamp screw 341 and spacer 345. Spring 333 is maintained in position by compression springs 335 which are pressed against by set screws 337 threaded into back side plate 27. The purpose of edge guide buttons 325 and 331 and the spring arrangement is to control the lateral position of the film as it goes through the perforating sequence. Another advantage of the gate configuration as shown in FIG. 10 is that front die holder 196 and rear die holder 198 are curved such that they define a curved path for the film approaching and leaving the perforating position so as to maintain the film in a bowed condition for overcoming any transverse curl the film might possess at the time it is perforated.

Also, as shown in FIG. 10, die 349 and pilot die 347 are pressed into die holders 196 and 198. When the machine is perforating, punches 130 fit with very small clearance into dies 349 and pilot pins 134 fit loosely into pilot dies 347. While an embodiment of the perforator has been described in which the elongated web to be perforated is a photographic motion picture film, it will be understood that other web materials, e.g., paper, may be perforated by apparatus in accordance with the present invention and such perforated webs of paper or other material may be advanced by a claw device in accordance with the present invention. Also, while the convex cam has been described as being associated with the shuttle arm 102 and the flat cam as being mounted by the spring members 140, 156, it is to be understood that the convex cam could be mounted on the spring members and the flat cam could be associated with the shuttle arm.

Figure 13:
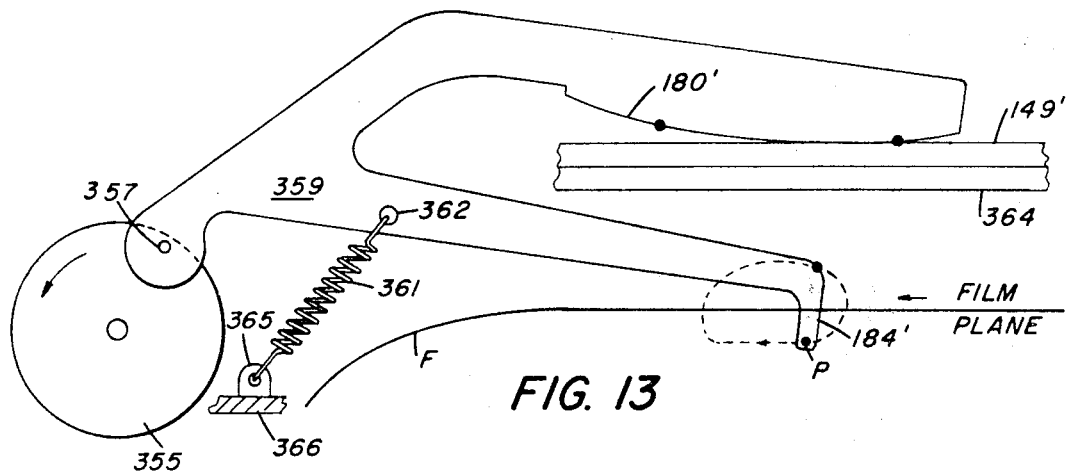
FIG. 13 is a schematic view of a modification of the perforator high speed shuttle mechanism adapted for use in an amateur motion picture camera.

Reference is now made to FIG. 13 which illustrates a simplified embodiment of my novel shuttle means which is particularly adapted for use in motion picture cameras where the intermittent pull-down speeds required are relatively slow. Since motion picture cameras, particularly those intended for amateur use, do not require such long design life, probably less than 100 hours as compared to 16,000 hours for the perforator, it is not necessary to eliminate slip between the rocker and flat cams 180 and 149 respectively. In fact, the flat cam need not be mounted in a moveable carriage or driven by an eccentric through the U-shaped coupling spring 170, but may be stationary with attendent simplicity and cost reduction. Also simple bearings will suffice in place of the ball bearings. Referring to FIG. 13, we see that drive shaft 355 is suitably journaled in bearings (not shown) which are mounted in frame members (not shown). Drive shaft 355 receives its power input from a motor (not shown) in the direction shown. Pin 357 is rigidly attached to drive shaft 355. Advance arm 359 is suitably journaled to pin 357 by a bearing assembly (not shown). Advance arm 359 contains an arcuate cam surface 180' which rides against stationary flat cam 149', which is rigidly attached to frame member 364 by suitable means (not shown). The resulting path of point P on the shuttle tooth portion 184 of advance arm 359 is shown by the dashed line in FIG. 13. The shuttle tooth portion of advance arm 359 suitably engages the perforations in the film so as to advance it the desired amount. It can be appreciated that the cams and eccentric drive can be placed to one side of the film with only shuttle tooth 184' being off-set to align with one of the rows of perforations in the film. In such a case the flat cam surface could be in the same plane as that of the film.

The stationary flat cam scheme shown in FIG. 13 is satisfactory for camera use since advance will take place during approximately one-half of one rotation of drive shaft 355. For a projector it is necessary to interrupt the light beam three or more times for each frame advance to avoid flicker problems. As a result the shuttle when designed for use in a motion picture projector must advance the film in about one-sixth or less of the time allocated for one frame at the usual projection frame rates (16-24 per second). The shuttle mechanism described for the perforator and the stationary flat cam version shown in FIG. 13 for motion picture cameras require nearly one-half of the frame period. A suitable embodiment adapted for use in motion picture projectors can easily be provided by using the "skip-frame" principle.

Figure 14:
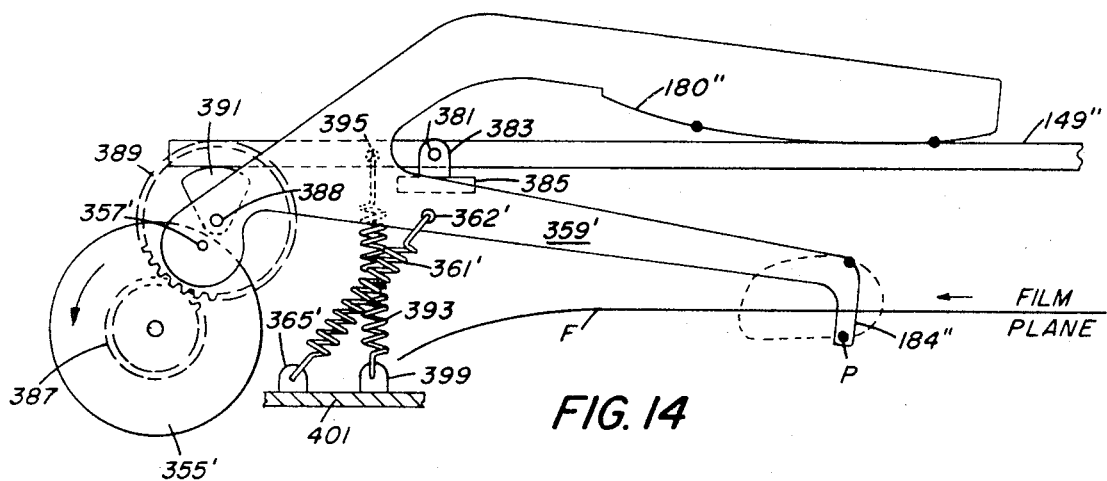
FIG. 14 is a schematic view of a modification of the perforator high speed shuttle mechanism adapted for use in an amateur projector.

FIG. 14 shows a modification of the perforator high speed shuttle device as it might be applied to an amateur motion picture projector. Drive shaft 355' is suitably journaled in bearings (not shown) which are mounted in frame members (not shown). Drive shaft 355' receives its power input from a motor (not shown), and is rotated in the direction shown. Pin 357' is rigidly attached to shaft 355'. Advance arm 359' is attached to pine 357' through a suitable bearing assembly (not shown). Gear 387 is mounted on shaft 355' by pins (not shown). Gear 389 is mounted on shaft 388 which is suitably journaled to rotate through bearings (not shown) which are mounted in the supporting frame members (not shown). Gear 389 meshes with gear 387 and provides the necessary speed reduction needed to obtain the proper skip frame rate. Peripheral 391 is rigidly mounted to gear 389 by pins (not shown). Flat cam 149" is attached to mounting bracket 383 through pin 381 and a suitable bearing assembly (not shown). Mounting bracket 383 is attached to frame member 385 by suitable means (not shown). One end of spring 393 is hooked around pin 395, which is rigidly attached to flat cam 149" to the left of pin 381. The other end of spring 393 is hooked around bracket 399 which is attached to support member 401 by suitable means (not shown). The purpose of spring 393 is to hold the left end of flat cam 149" in contact with cam 391. Advance arm 359' has a peripheral cam surface 180" which rides in contact with the portion of flat cam 149" that is to the right of pivot pin 381. One end of spring 361' hooks around pin 362' which is rigidly attached to advance arm 359'. The other end of spring 361' hooks around bracket 365' which is rigidly attached to support member 401 by suitable means (not shown). The purpose of spring 361' is to hold the cam 180" of advance arm 359' in contact with flat cam 149". The arcuate cam surface 180" on advance arm 359' is of such a shape so as to cause point P on the shuttle tooth portion 184" of advance arm 359' to engage a perforation in the film and to cause point P to follow a path approximated by the dashed line in FIG. 14. Cam 391 has an arcuate surface such that point P engages the perforation and then properly disengages the perforation during one rotation of drive shaft 355'. The shape of cam 391 also is such that it urges the left end of flat cam 149" in such a way that point P will not engage the perforation of the film during the subsequent two rotations of drive shaft 355'. Depending upon the gear ratio, any number of skipped strokes can be provided. It should be noted that flat cam 149" and the arcuate cam portion 180" of advance arm 359' can be placed to one side of the film with only the shuttle tooth 184" being off-set to align with the row of perforations in the film strip. In such a case the flat cam surface could be in the same plane as that of the film.

Figure 15:
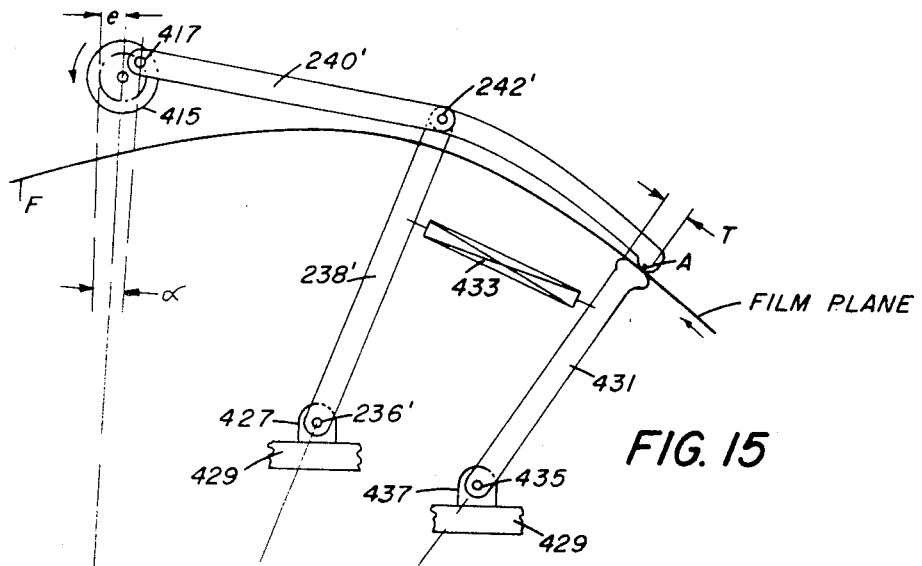
FIG. 15 is a schematic view of a modification of the perforator thread-up shuttle mechanism adapted for use in an amateur camera.

The film intermittent drive on the perforator used during thread-up is a shuttling device which is designed to drive a film which has no perforations. FIG. 15 shows a modification of the thread-up shuttle design that may be used in a motion picture camera that can accommodate perforated or unperforated film.

Referring in detail to FIG. 15, we see that drive shaft 415 is suitably journaled to rotate in bearings (not shown) which are mounted to fixed frame members (not shown). Drive shaft 415 receives its power input from a motor (not shown) in the direction shown. Pin 417 is rigidly attached to eccentric drive shaft 415. Shuttle arm 240' is rotatably attached to pin 417 through a suitable bearing assembly (not shown). One end of arm 238' is attached to shuttle arm 240' by pin 242' and a suitable bearing assembly (not shown). The other end of arm 238' is rotatably attached to bracket 427 by pin 236' and a suitable bearing assembly (not shown). Bracket 427 is attached to frame member 429 by suitable means (not shown). Arm 431 is attached to arm 238' by link connection 433 having either end pivots or end connections. The bottom end of arm 431 is attached to bracket 437 through pin 435 and a suitable bearing assembly (not shown). Bracket 437 is attached to frame member 429 by suitable means (not shown). The top end of arm 431 and pad surface A may be covered by a high-friction material, such as polyurethane, to improve the film driving force with less spring pressure. The upper surface of arm 431 is trimmed accurately to provide optimum driving geometry and is mounted just a few thousandths of an inch below the film surface. Link connection 433 is so located in relation to pins 236' and 435 as to produce the desired film advance travel of the upper surface of arm 431. The advantages of the embodiment shown in FIG. 13 is the added positive driving force imparted to the film. This leads to high precision as was the case in one experimental perforator in which this was the sole means of advance and pitch determination of the resulting film. Operation with lower clamp forces or high speed or both are improved by this arrangement. The locations of the center of eccentric drive shaft 415, pin 242', pine 236' and pin 435 are obtained by the same considerations as described above in arriving at the corresponding point in FIG. 11. As eccentric drive shaft 415 rotates in the direction shown in FIG. 15 the film is advanced in the direction shown by the arrow in FIG. 15. Intermittent advance of film F will take place during approximately one-half of the rotation of drive shaft 415. The driving control pad A is suitably attached to arm 240' by means of resilient connections and a stop as described in relation to FIG. 9.

Figure 16:
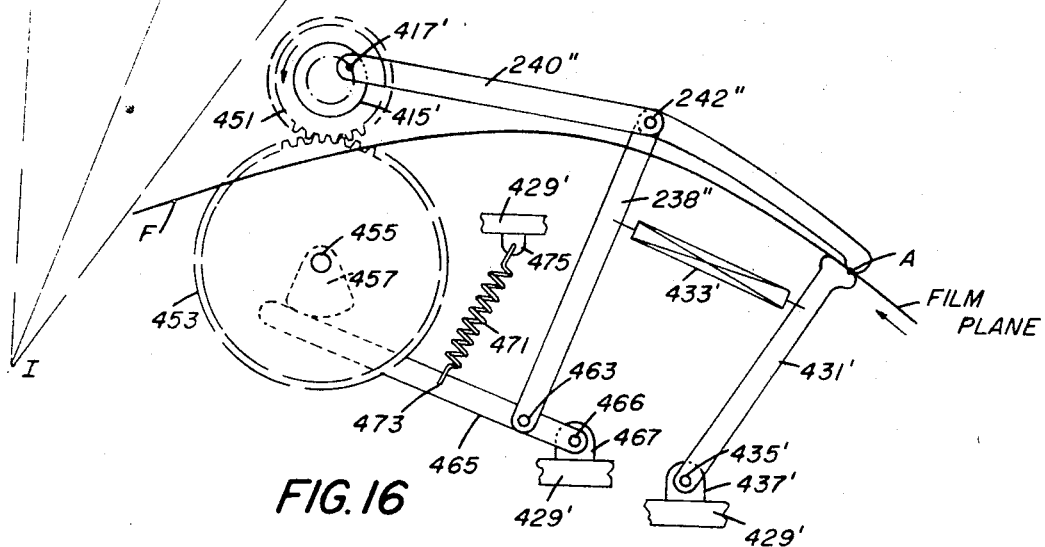
FIG. 16 is a schematic view of a modification of the perforator thread-up shuttle mechanism adapted for use in an amateur projector.

FIG. 16 shows a schematic of a further modification of the perforator thread-up shuttle mechanism that might be used in an amateur motion picture projector application. Drive shaft 415' is suitably journaled to rotate in bearings (not shown) which are mounted on fixed frame members (not shown). Drive shaft 415' receives its power input from a motor (not shown) in the direction shown. Pin 417' is rigidly attached eccentrically to drive shaft 415'. Shuttle arm 240" is rotatably journaled to pin 417' through a suitable bearing assembly (not shown). Gear 451 is mounted on shaft 415' which is suitably journaled to rotate in the frame members (not shown). Cam 457 is rigidly attached to gear 453 by pins (not shown). Arm 238" is rotatably journaled to shuttle arm 240" by pin 242" which in turn is rigidly attached to shuttle arm 240" by a suitable bearing assembly (not shown). The other end of arm 238'' is pivotally attached to cam follower arm 465 by pin 463 and a suitable bearing assembly (not shown). The right hand end of cam follower arm 465 is pivotally attached to bracket 467 through pin 466 and a suitable bearing assembly (not shown). Bracket 467 is attached to support member 429' by any suitable means (not shown). The purpose of spring 471 is to hold the left end of cam follower arm 465 in contact with the peripheral surface of cam 457. Arm 431' is attached to arm 238'' by link connection 433' which can have either end pivots or flexible end connections. The bottom end of arm 431' is attached to bracket 437' through pin 435' and a suitable bearing assembly (not shown). Bracket 437' is rigidly attached to support member 429' by any suitable means (not shown). As drive shaft 415' is driven in the direction shown in FIG. 16 film F is advanced intermittently in the direction shown by the arrow in FIG. 16. The purpose of cam 457 is to urge the left end of cam follower arm 465 in such a manner so that the relative location of pins 463, 242'' and 435' is altered so that the film is intermittently advanced a distance equal to one frame pitch during one rotation of drive shaft 415 and not advanced during the subsequent two rotations of drive shaft 415'. Depending upon the gear ratio any number of skipped strokes can be provided. The relative locations of drive shaft 415', pin 242'', pin 463 and pin 435' are determined in the same manner as above described for the embodiment shown in FIG. 11. The location of link connection 433' in relation to pin 463 on cam follower arm 465 and pin 435' is chosen such that the desired film travel is obtained at the film advancing station. The driving contact pad A is suitably attached to arm 240'' by means of resilient connections and a stop as described in relation to FIG. 9.

Figure 17:
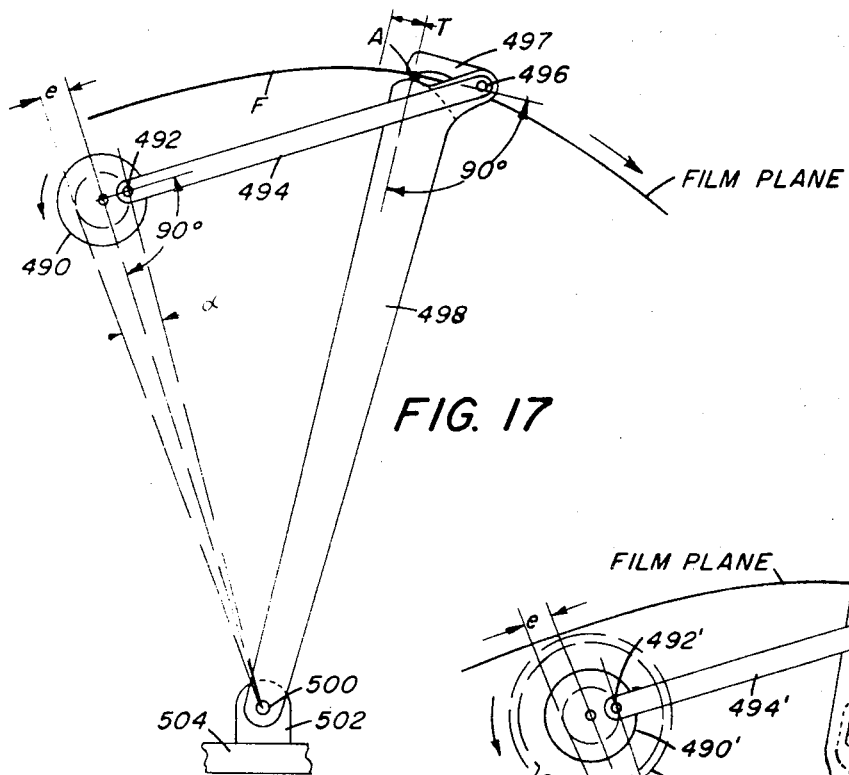
FIG. 17 is a schematic showing of another modification of the perforator thread-up shuttle mechanism adapted for use in an amateur camera.

FIG. 17 shows a further modification of the thread-up shuttle used in the perforating device as it might apply to an amateur motion picture camera that can accommodate either perforated or unperforated film. Drive shaft 490 is suitably journaled to rotate through bearings (not shown) which are mounted in a frame support (not shown). Eccentric pin 492 is rigidly attached to drive shaft 490. Shuttle arm 494 is attached to drive shaft 490 through pin 492 and a suitable bearing assembly (not shown). The other end of shuttle arm 494 is pivotally attached to arm 498 at point 496 and terminates in a gripper finger 497 which is adapted to pinch the film between itself and top edge of arm 498 during the film advance stroke. Finger 497 with its contact pad A is resiliently connected to arm 494 with a stop arranged to lift A from the film for the return stroke as discussed in connection with FIG. 9. The bottom of arm 498 is attached to bracket 502 through pin 500 in a suitable bearing assembly (not shown). Bracket 502 is rigidly attached to support member 504 by any suitable manner (not shown). Preferably the angle between the lines formed between pin 500 and the center of drive shaft 490 and a line drawn between the center of drive shaft 490 and pin 496 should be approximately 90° for optimum operation. In like manner the line drawn between pin 500 and point A where the film is gripped by the gripper 497 and to top of arm 498 should be at approximately 90° to the tangent to the film path as drawn at point A. The pivot center 496 should preferably be on the same tangent to the film path. The embodiment shown in FIG. 17 may be preferable to that shown in FIG. 15 where space requirements might be restricting for some applications. As drive shaft 490 rotates in the direction shown in FIG. 17, the film is advanced intermittently in the direction shown by the arrow in FIG. 17. Note that this intermittent film travel is opposite in direction to the application shown in FIG. 15. The geometry can be arranged with equal ease and simplicity such that pivot 496 falls to the left of point A in which case the film is advanced to the left for the direction of rotation shown on FIG. 17. In the modification shown in FIG. 17, arm 498 takes the place of arms 238 and 431 and link connection 433 in the configuration as shown in FIG. 15. In the camera or perforator application, as shown in FIG. 17, it is understood that the gripper 497 on the right end of shuttle arm 494 pinches the film against the top of arm 498 during approximately one-half of the eccentric rotation and lifts away from the film for the remainder of the time.

Figure 18:
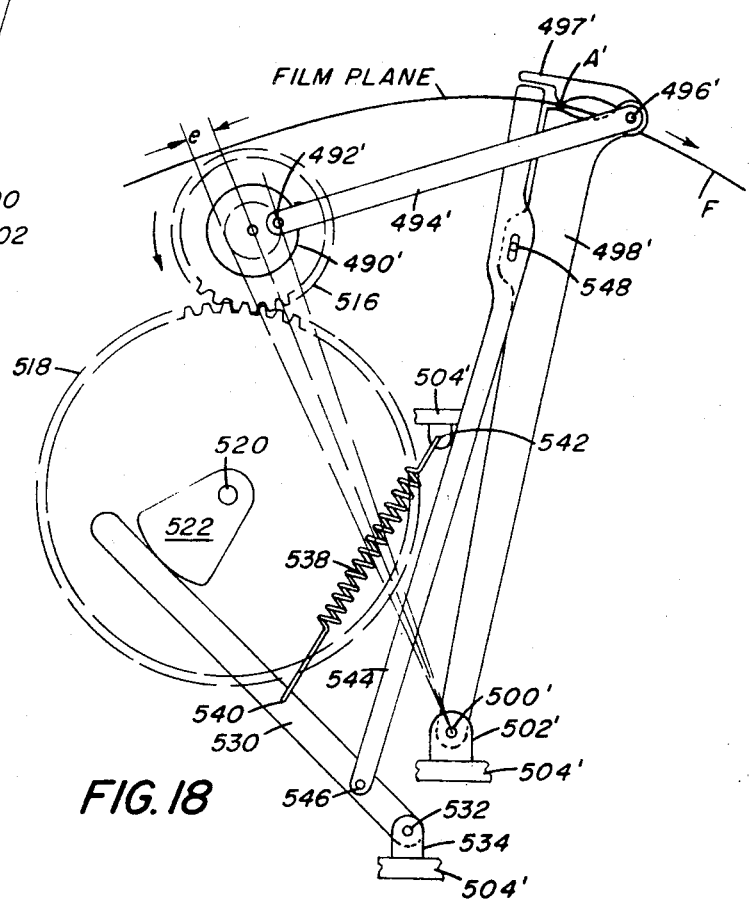
FIG. 18 is a schematic showing of a modification of the embodiment of the perforator thread-up shuttle mechanism shown in FIG. 17 which is adapted for use in an amateur motion picture projector.

FIG. 18 shows a further embodiment of the thread-up shuttle of the perforator as it might be modified to operate as an intermittent feed applicable to an amateur motion picture projector. Eccentric pin 492' is rigidly attached to drive shaft 490' which is suitably journaled to rotate in bearings (not shown) which are mounted in a support member (not shown). The left end of shuttle arm 494' is attached to drive shaft 490' by pin 492' and a suitable bearing assembly (not shown). Gear 516 is fixedly mounted on drive shaft 490' and gear 518 is rigidly mounted on shaft 520 which is suitably journaled to rotate in bearings (not shown) which are suitably mounted in the support frame (not shown). Gear 518 meshes with gear 516 to give the desired 3:1 or other ratio of speed reduction necessary for skip frame operation as required in a motion picture projector. Cam 522 is mounted rigidly on gear 518 by pins (not shown). The right end of shuttle arm 494' is pivotally attached to arm 498' by pin 496' and terminates in a gripper finger 497' which is adapted to pinch the film between itself and the top edge of arm 498' during the film advance stroke. Finger 497' with its contact pad A' is resiliently connected to arm 494' with a stop arranged to lift A' from the film for the return stroke as discussed in connection with FIG. 9.

The bottom end of arm 498' is attached to bracket 502' through pin 500' in a suitable bearing assembly. Bracket 502' is rigidly attached to support member 504' by any suitable means (not shown). The right end of cam follower arm 530 is pivotally attached to bracket 534 by pin 532 and bracket 534 is rigidly mounted to support member 504' by any suitable means (not shown). One end of spring 538 is hooked around pin 540 attached to cam follower arm 530 and the other end of spring 538 is hooked onto bracket 542 which is rigidly mounted to support member 504' by any suitable means (not shown). The bottom end of arm 544 is pivotally attached to cam follower arm 530 through pin 546 and a suitable bearing assembly (not shown). Pin 548 is rigidly attached to arm 498' and fits through a slot in arm 544 so that arms 544 and 498' may have relative motion in the direction of the slot only. The purpose of spring 538 is to urge cam follower arm 530 into continuous contact with the peripheral surface of cam 522. The surface of cam 522 is of such a shape that during the first rotation of shaft 490' the film is gripped at point A' between the gripper portion 497' of shuttle arm 494' and the top of arm 498' during one-half of the shaft rotation and lifts away from the film for the remainder of the time. During the subsequent two rotations of shaft 490', the surface of cam 522 is such that it urges cam follower arm 530 upwards which in turn causes pin 546 and arm 544 to move upwards. Arm 544 then contacts arm 497' and raises it sufficiently to prevent the film from being advanced during the subsequent revolutions of drive shaft 490'. Depending upon the gear ratio, any number of skipped strokes can be provided. With the direction of rotation shown in FIG. 18 for drive shaft 490', the film is advanced intermittently to the right as shown by the arrow. The pivot point 496' can alternatively be located to the left of point A' reversing the film travel direction as explained for FIG. 17. The top surface of arm 498' in the vicinity of point A' engaged by pad surface A' may be covered with a high friction material, such as polyurethane, to further enhance the film advancing action. The region of arm 498' around point A' is carefully trimmed and mounted a few thousandths of an inch below the film surface.

It may be desirable to locate pin 546 substantially in line with pin 500' in order to prevent unwanted relative motion between arm 544 and arm 598'. The arrangement shown in FIG. 18 is presented for the sake of clarity.

The invention has been described in detail with particular reference to preferred embodiments thereof, but it will be understood that variations and modifications can be effected within the spirit and scope of the invention.

I claim:

1. A film advancing assembly for intermittently feeding a perforated film strip through a path defined by a guideway and comprising the combination with a claw member having a claw on one end thereof intermittently engaging successive perforations of said filmstrip, and including an eccentric member for reciprocating said claw member through a pull-down stroke, of means for causing said claw to engage a film perforation at the beginning of and during said pull-down stroke and retracting it at the end of said pull-down stroke and maintaining it retracted throughout the return stroke of said claw, said last mentioned means including:
    1. an elongated flat cam extending lengthwise of said guideway adjacent the portion of said guideway over which said claw reciprocates, and
    2. a rocker cam fixed to said claw member and constantly urged into engagement with said flat cam; means for so mounting said flat cam that it can reciprocate lengthwise, and during such reciprocation will move parallel to itself toward and away from said guideway; and means for reciprocating said flat cam in synchronism with the reciprocation of said claw member.

2. A film advancing assembly as defined in claim 1, wherein said mounting means for said flat cam comprises at least two substantially parallel suspension springs suspending said flat cam from a fixed support, said springs being tuned to the operating speed for the mass of the flat cam and all parts associated with its connection to the free ends of the suspension springs.

3. The film advancing assembly as defined in claim 1, wherein the means for reciprocating said flat cam in synchronism with the reciprocation of said claw member comprises a leaf type coupling spring connected at one end to a claw member and its opposite end to the flat cam to transmit reciprocal motion from the claw member to the flat cam.

4. The film advancing assembly as defined in claim 3, in which said coupling spring is so formed and connected to the claw member and flat cam as to produce negligible slippage between the flat cam and rocker cam and to maintain proper contact pressure between the cams at all times.

5. A film advancing assembly as defined in claim 2, characterized in that the flat cam slants substantially 20° to the film path to make the acceleration pattern of the drive system for the flat cam approach a simple harmonic that can be and is tuned by the suspension springs.

6. A film advancing assembly as defined in claim 3, characterized by the fact that the end of the coupling spring attached to the claw member is rotated slightly in a counter-clockwise direction relative to the remainder of the spring for maintaining contact pressure between the cams at all speeds of operation.

7. A film advancing assembly for intermittently feeding a perforated film strip through a path defined by a guideway and comprising the combination with a claw member having a claw on one end thereof intermittently engaging successive perforations of said film strip, and including an eccentric member for reciprocating said claw member through a pull-down stroke; of means for causing said claw to engage a film perforation at the beginning of and during the pull-down stroke and retracting it at the end of said pull-down stroke and maintaining it retracted throughout the return stroke of said claw, said last mentioned means including an elongated flat cam spaced to one side of and extending lengthwise of said guideway; means for mounting said flat cam so that it can reciprocate lengthwise and during said reciprocation will move parallel to itself toward and away from the guideway, and including a carriage to which said flat cam is fixed; at least two vertical suspension springs fixed at one end and coupled at the other end to opposite ends of said carriage, said springs being tuned to the operating speed of the carriage mass; means for reciprocating said carriage and flat cam carried thereby in synchronism with the reciprocation of the claw member; and a rocker cam fixed to said claw member and constantly engaging said flat cam.

8. A film advancing assembly for intermittently advancing a perforated film strip through a path defined by a guideway and comprising the combination with a claw member having a claw on one end thereof intermittently engaging successive perforations of said film strip, and including an eccentric member for reciprocating said claw member through a pull down stroke; of means for causing said claw to engage a perforation at the beginning of and during said pull-down stroke and retracting said claw from the engaged perforation at the end of the pull-down stroke and maintaining it retracted throughout the return stroke of said claw comprising,
    1. a carriage having an elongated flat cam surface spaced to one side of and extending lengthwise of said guideway;
    2. mounting means for said carriage allowing it to reciprocate lengthwise of said guideway with said claw member and including
        a. two vertical suspension springs fixed at one end and coupled at the other end to opposite ends of said carriage, said springs being tuned to the operating speed of the carriage mass;

3. means for reciprocating said carriage in synchronism with the reciprocation of said claw member, and including
   a. a leaf type coupling spring fixed at oen end to the claw member and at its opposite end to the carriage; and 4. means for controlling the tip of the claw to follow the desired path relative to said film path during the reciprocation of the claw member, and including
   a. a rocker cam fixed to said claw member to reciprocate therewith, and
   b. the end of said leaf-type coupling spring connected to said claw member twisted to maintain said flat cam surface and said rocker cam in constant engagement with each other during reciprocation of the two.

9. A film advancing assembly for intermittently feeding a perforated film strip through a path defined by a guideway and comprising the combination with a claw member having a claw on one end thereof and intermittently engaging successive perforations of said film strip, and including an eccentric drive for reciprocating said claw member through a pull-down stroke; of means causing the claw to engage a perforation at the beginning of and during said pull-down stroke to be retracted from engagement with the film at the beginning of and during the return stroke of said claw; said last mentioned means including spring means acting on said claw member and urging said claw toward the film path; an elongated flat cam extending lengthwise of said guide-way and having a length at least as long as the stroke traveled by said claw; and a rocker cam fixed to said claw member and having a convex cured surface constantly urged into rocking engagment with said flat cam by said spring means to control the in and out movement of the claw relative to the film path defined by said guideway.

10. A film advancing assembly as defined in claim 9 and including means for holding said claw from engagement with said film strip during two successive pull-down strokes out of every three to provide a "skip-stroke" pull-down suitable for use in a motion picture projector.

11. A film advancing assembly as defined in claim 10 wherein said last mentioned means includes means for mounting said flat cam to move between an operative position, wherein it allows said rocker cam to move toward said guidway and to a position where the claw can enter a film perforation during the pull-down stroke, and an inoperative position, wherein said rocker cam is moved away from said guideway and to a position where the claw cannot engage a film perforation during its pull-down stroke, and means driven in synchronism with the eccentric drive for reciprocation said claw for moving said flat cam to its operative position every third or fourth pull-down stroke of said claw and moving it to and holding it in its inoperative position for the successive pull-down strokes of the claw between each pull-down stroke.

12. A film advancing assembly as defined in claim 10, characterized in that said flat cam is normally moved to its operative position, and said last mentioned means moves said flat cam to, and holds it in, its inoperative position for two successive pull-down strokes out of every three.

13. A film advancing assembly for intermittently feeding an unperforated web strip through a given path comprising the combination of:
   1. a web guideway defining a portion of said path and including:
      a. support means for supporting one face of the web, said support means including a roller to facilitate movement of said web,
      b. edge guides for guiding the edges of said web, and
      c. means for providing access to the other face of said web;
   2. a shuttle reciprocatable through a path including a web advancing stroke and a return stroke;
   3. a friction pad attached to said shuttle to reciprocate therewith;
   4. means for reciprocating said shuttle and causing said friction pad to move, via said access means, into pressing engagement with the other face of said web at the beginning of and during the web advancing stroke of said shuttle to advance said web said pad retracting saidpad from engagement with said web during said return stroke.

14. A film advancing assembly as defined in claim 13, wherein said shuttle comprises an elongated arm pivoted intermediate its ends on a movable pivot, said friction pad attached to one end of said arm and the other end of said arm connected with an eccentric.

15. A film advancing assembly as defined in claim 14, wherein the attachment of the friction pad to said shuttle comprises a resilient break-away connection causing the pad to move with the shuttle at all times except after the pad moves into engagement with the other face of the web, at which time the shuttle moves relative to the pad and stresses a spring which resiliently urges the pad into engagement with the web.

16. A film advancing assembly for intermittently feeding an unperforated film strip through a given path comprising the combination of:
   1. a curved film guideway defining a portion of said path and including edge guides for guiding the edges of said film,
   2. means for intermittently frictionally gripping the film and advancing it through said guideway and including
      a. a shuttle reciprocatable through a path including a film advancing stroke and return stroke,
      b. a film supporting member engageable with one surface of said film at said guideway, said film supporting member being mounted to reciprocate along said curved portion of said film path,
      c. a film engaging jaw on said shuttle and adapted to engage the other face of said film and pinch said film against said supporting member,
      d. means for reciprocating said shuttle through film advancing and return strokes, and for causing said film engaging jaw to move into pressing engagement with the other face of said film at the beginning of and during the film advancing stroke of the shuttle to advance the film during said return stroke; and
      e. means connecting said film supporting member with said shuttle so that said film supporting member is reciprocated by said shuttle and in synchronism therewith.

17. A film advancing assembly as defined in claim 16, wherein the film engaging portion of said film supporting member and/or said film engaging jaw is with a non-abrasive material having a relatively high coefficient of friction for obtaining a good friction grip on the film.

18. A film advancing assembly as defined in claim 16 and including means for holding said film engaging jaw from engagement with said film strip during two successive film advancing strokes out of every three of the shuttle to provide a "skip-stroke" film advance suitable for use in a motion picture projector.

19. Apparatus for intermittently positioning along a path a web having a plurality of aligned discontinuities formed therein, said apparatus comprising:
1. a rotary drive member;
2. a driven member in communication with said drive member and movable with respect to said drive member and to said path, said driven member including means for engaging respective ones of said discontinuities;
3. motive means for use in:
   a. moving said engaging means into contact with a discontinuity during a first portion of a revolution of said drive member,
   b. maintaining said contact throughout a second portion of said revolution during which said engaging means is so moved along said path as to position said web therealong,
   c. moving said engaging means out of contact with said discontinuity during a third portion of said revolution and
   d. moving said engaging means relative to said web during a remaining portion of said revolution;
4. said motive means including a first cam having a first cam surface and a second cam having a second, convex, cam surface, said second cam being in communication with said engaging means;
5. means for urging said first and second cam surfaces into camming engagement; and
6. means for mounting said first cam for substantially linear reciprocation in a plane normal to the axis of rotation of said drive member; and means for synchronizing said reciprocation with the movement of said engaging means.

20. Apparatus as defined in claim 19, wherein said mounting means includes at least two substantially parallel link members each including at least one spring member, each of said links being connected at one end to a support and at the other end to said first cam, said springs being so tuned to an intended operating speed of the apparatus that the system comprising the springs and the members carried thereby is resonant at said intended operating speed.

21. apparatus as defined in claim 19, wherein said synchronizing means includes a coupling spring so interconnecting said engaging means and said first cam to transmit reciprocal motion therebetween.

* * * * *